W. WRIGHT.

Steam Pump.

No. 6,393.

Reissued April 20, 1875.

Witnesses:
Michael Ryan
Fred Haynes

Valley Machine Company
John Mayher Treas.
by their Attorneys
Brown & Allen

THE GRAPHIC CO. PHOTO-LITH. 39 & 41 PARK PLACE, N.Y.

UNITED STATES PATENT OFFICE.

WILLIAM WRIGHT, OF NEW YORK, N. Y., ASSIGNOR TO THE VALLEY MACHINE COMPANY, OF EAST HAMPTON, MASSACHUSETTS.

IMPROVEMENT IN STEAM-PUMPS.

Specification forming part of Letters Patent No. 100,703, dated March 8, 1870; reissue No. 6,393, dated April 20, 1875; application filed March 25, 1875.

*To all whom it may concern:*

Be it known that WILLIAM WRIGHT, of the city, county, and State of New York, did invent new and useful Improvements in Steam-Pumps, of which the following is a full, clear, and exact description, reference being had to the accompanying drawing, which forms part of this specification.

One feature of this invention consists in the combination of a pump-cylinder, a bucket-plunger fitted therein, an air-chamber, a passage establishing communication between the pump-cylinder and air-chamber above the bucket-plunger, a channel or set of channels establishing communication between the said pump-cylinder and air-chamber below the bucket-plunger, and suitable induction and eduction or discharge valves, whereby each time the bucket-plunger ascends it will draw into the pump a large body of water, which will be discharged partly during the descent of the said bucket-plunger and partly during the next ascent of the same, and a more uniform and steady discharge is obtained than in bucket and plunger pumps of the ordinary construction. Another feature of the invention consists in a removable bottom plate, provided with induction and eduction or discharge passages, and induction and eduction or discharge valves, whereby said valves may be repaired or adjusted without disturbing the other working parts of the pump. Another feature of the invention consists in the combination of a steam-cylinder, a pump-cylinder, a frame-work rigidly connecting the said cylinders, an air-chamber rigidly connected to said pump-cylinder, and suitable bearings upon the air-chamber for a crank-shaft, supported in such bearings, whereby a compact and very stable pump is obtained, and jarring almost entirely obviated.

Figure 1:
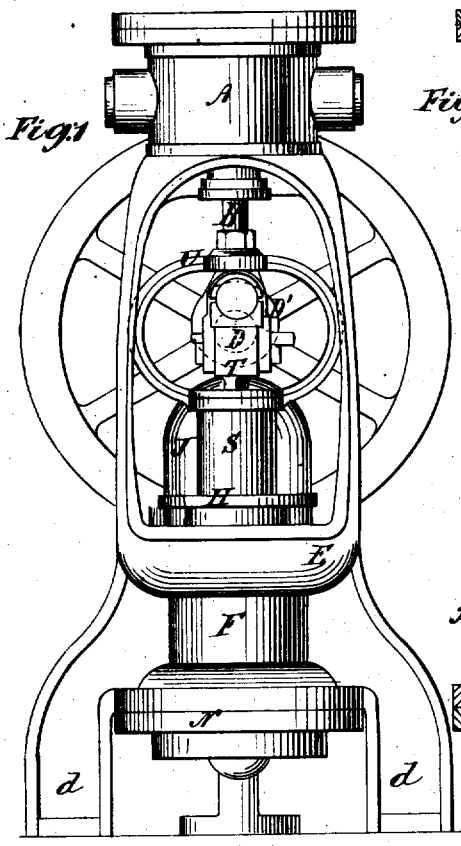
Figure 2:
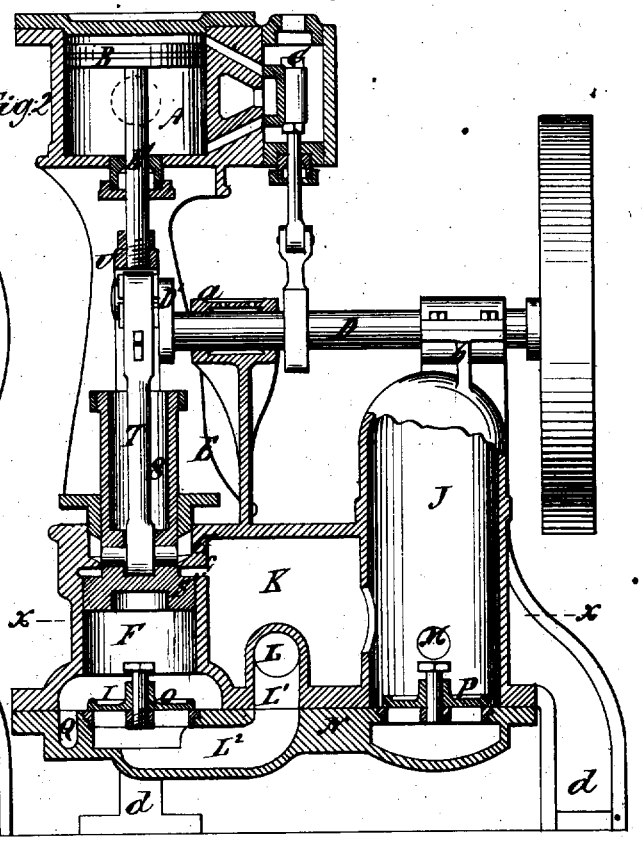
Figure 4:
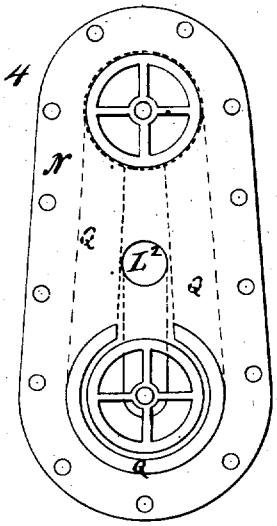
Figure 3:
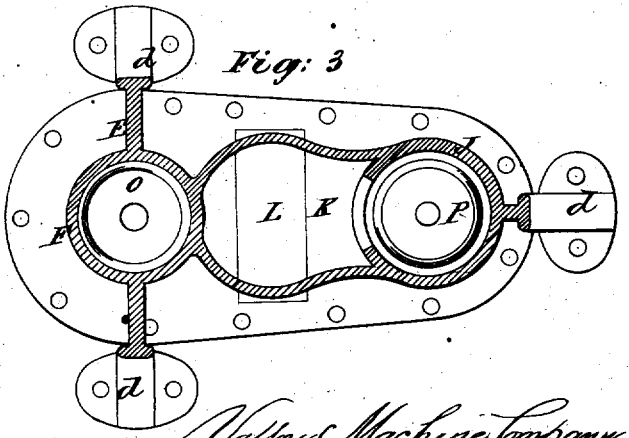

The accompanying drawing represents the invention embodied in a pump whose plunger is provided with a trunk. Figure 1 is a front elevation of such pump. Fig. 2 is a sectional elevation taken centrally through the pump. Fig. 3 is a horizontal section of the same taken on the plane of the dotted line *x x*, Fig. 1; and Fig. 4 is a plan of the bottom plate.

Similar letters of reference indicate corresponding parts in all the figures.

A is the steam-cylinder, B its piston, and C the steam-chest, containing the valve, which is operated by an eccentric on the main or crank shaft. E is the vertical frame for carrying the several parts, including the journal-box *a* for the crank-shaft. This frame also has cast with it in one piece the steam-cylinder A, the pump-cylinder F, the stuffing-box G for the gland H, and the induction-valve chamber I, all in the same line or plane, and has, furthermore, cast on or with it the air-chamber J K, which is represented as consisting of two compartments, J and K, the former of which is provided with a second crank-shaft bearing, *b*. The compartment K of said air-chamber communicates with the pump-cylinder above the plunger, through a space or channel, *c*. Said frame also has cast in it the suction-channel L that communicates with a branch opening, $L^1$, in the base of the frame, and is left open at either end for the reception of the suction pipe or pipes, and the compartment J of the air-chamber is similarly provided with discharge-nozzles M on either or opposite sides of it.

By thus arranging and casting all in one piece with the frame E, of which they may be said to form part, the steam-cylinder with its attachments, the pump-cylinder and stuffing-box, the induction-valve chamber and suction-channels, together with the air-chamber and bearing or bearings to the crank-shaft, the rigidity and stability of the pump are materially increased, and it is insured a steady operation, besides which the cost and labor of fitting are reduced.

The bottom of said frame, taken as a whole, or the lower face of the same above leg-extensions *d* thereto, is fitted to receive a plate, N, which carries on its upper face the induction-valve O and seat thereto; also the discharge-valve P and its seat; likewise is provided with a channel, $L^2$, to connect the suction-channel L, through the opening $L^1$, with the space below the induction-valve O; and another channel or channels, Q, arranged to connect the induction-valve chamber I above the induction-valve, and outside of or around the suction-channel $L^2$ with the space below the discharge-valve P. This plate N is secured by flange and bolts to the lower face of the main frame above and inside of the leg-extensions *d*, which latter should project a sufficient distance below the bottom of the valve-plate N, to allow of the same being taken off and removed without disturbing other parts of the machine.

It is preferred to use only a single induction-valve, and single eduction or discharge valve; but, of course, the same may be in pairs or sets.

This arrangement of the induction and eduction valves in or on the removable plate N, taken in connection with the arrangement of the induction and discharge pipes or outlets in the fixed portion of the frame, provides for repairing or adjusting the valves without disturbing the suction or discharge pipes at their joints, and without interfering with the working connections generally.

The plunger of the pump is represented in the drawing as consisting of a trunk-piston, and is so constructed as that the area of the trunk-portion S, in its whole area, is about one-half the area of the piston portion S′. This plunger of the pump is connected with the rod B′ of the steam-piston B by a yoke or frame, U, and it is also connected to a crank, D′, to impart motion to the shaft D.

The drawing represents the yoke U connecting the trunk portion S of the plunger with the rod B′, and a pitman, T, connecting the piston portion S′ of the plunger with the crank D′.

By this connection of the steam-piston, the pump-plunger, and the crank-shaft, much space is economized, and a direct action is secured from the steam-plunger.

The operation is as follows: Supposing the pump to be in working order, and the several channels or passages to be full of water, and the pump-plunger to have made its upward stroke, water will have been caused to enter through the induction-valve O, and made to fill the pump-cylinder below the said plunger, that in such upward stroke will have displaced the water previously contained in the pump-cylinder above such plunger, and which in the example of my invention illustrated in the drawing is only equal to about one-half of the quantity of water drawn in through the induction-valve O.

The water thus displaced by the upper face of the plunger escapes by the passage *c* back into the compartment of the air-chamber K, thence into the compartment J thereof, and out through the discharge nozzle or nozzles M. In the return or down stroke of the pump-plunger, the water previously drawn into the pump-cylinder below the plunger is discharged through the channel or channels Q, and through the discharge-valve P, into the compartment J of the air-chamber, which water serves—that is, about one-half of it—to keep up the supply above the plunger in the descent of the latter, and the other half to maintain the discharge through the nozzle or nozzles M.

It will be observed that the pump only draws in water during its upward stroke, but that it discharges during both strokes, each discharge being equal to about half the quantity drawn in, the same being effected with only one induction-valve or set of induction-valves, and one eduction or discharge valve or set of eduction or discharge valves, such valves opening but once during each up-and-down movement of the plunger combined. In one sense, the discharge, though kept up during both strokes, is wholly maintained by the downstroke of the plunger, as the water is all drawn in below the plunger in its ascent, and in the descent of the latter is all discharged or driven back through the bottom of the pump or channel way or ways Q.

By this arrangement a much larger amount of space is secured alike for the induction and eduction or discharge valve or valves than where the water is passed through the bucket, and hence a greater working economy ensues.

What is here claimed, and desired to be secured by Letters Patent, is—

1. The pump-cylinder F, in open communication, at or near its top, with the air-chamber J, above the discharge-valve P, and in communication below, by a channel or passage, with the under side of said valve, in combination with the pump-plunger and induction-valve O to the inlet-passage of the pump, substantially as specified.

2. The removable valve-plate N, with its induction and eduction or discharge valves O and P, inlet-passages $L^2$, and outlet Q, in combination with the induction channel or passage L, and eduction nozzle or nozzles M, arranged above in a fixed portion of the main frame, essentially as described.

3. The combination of the main frame, the steam-cylinder, the pump-cylinder, the air-chamber, and the bearings for the crank-shaft, all arranged substantially as specified.

VALLEY MACHINE COMPANY,

By JOHN MAYHER, *Treasurer*.

Witnesses:

H. D. RICHARDSON,

FRANK MILLER.